US012642623B2

(12) United States Patent
Cunliffe et al.

(10) Patent No.: US 12,642,623 B2
(45) Date of Patent: Jun. 2, 2026

(54) AUTOMATED PROCESS FOR INTERMEDIATE ORTHODONTIC DIGITAL SETUP GENERATION

(71) Applicant: Solventum Intellectual Properties Company, Maplewood, MN (US)

(72) Inventors: Alexandra R. Cunliffe, St. Paul, MN (US); Benjamin D. Zimmer, Hudson, WI (US); Jonathan D. Gandrud, Woodbury, MN (US); Guruprasad Somasundaram, St. Paul, MN (US); Arash Sangari, Frisco, TX (US); Deepti Pachauri, Minneapolis, MN (US); Shawna L. Thomas, College Station, TX (US); Nancy M. Amato, Champaign, IL (US)

(73) Assignee: Solventum Intellectual Properties Company, Eagan, MN (US)

( * ) Notice: Subject to any disclaimer, the term of this patent is extended or adjusted under 35 U.S.C. 154(b) by 1464 days.

(21) Appl. No.: 16/652,755

(22) PCT Filed: Sep. 27, 2018

(86) PCT No.: PCT/IB2018/057516
§ 371 (c)(1),
(2) Date: Apr. 1, 2020

(87) PCT Pub. No.: WO2019/069191
PCT Pub. Date: Apr. 11, 2019

(65) Prior Publication Data
US 2020/0229900 A1    Jul. 23, 2020

Related U.S. Application Data

(60) Provisional application No. 62/569,081, filed on Oct. 6, 2017.

(51) Int. Cl.
*A61C 7/00* (2006.01)
*A61C 9/00* (2006.01)

(52) U.S. Cl.
CPC ............ *A61C 7/002* (2013.01); *A61C 9/0053* (2013.01)

(58) Field of Classification Search
CPC .............................. A61C 7/002; A61C 9/0053
See application file for complete search history.

(56) References Cited

U.S. PATENT DOCUMENTS

| | | |
|---|---|---|
| 6,318,994 B1 | 11/2001 | Chishti et al. |
| 6,540,512 B1 | 4/2003 | Sachdeva et al. |
| 6,783,360 B2 | 8/2004 | Chishti |
| 7,605,817 B2 | 10/2009 | Zhang et al. |
| 7,956,862 B2 | 6/2011 | Zhang et al. |
| 2002/0015934 A1 | 2/2002 | Rubbert et al. |
| 2002/0042038 A1 | 4/2002 | Miller et al. |
| 2004/0073417 A1 | 4/2004 | Rubbert et al. |
| 2005/0043837 A1 | 2/2005 | Rubbert et al. |
| 2005/0244791 A1 | 11/2005 | Davis et al. |
| 2008/0057461 A1 | 3/2008 | Cheng et al. |
| 2008/0306724 A1 | 12/2008 | Kitching et al. |
| 2013/0317800 A1 | 11/2013 | Wu et al. |
| 2015/0254410 A1 | 9/2015 | Sterental et al. |
| 2015/0351871 A1 | 12/2015 | Chishti et al. |
| 2016/0120616 A1 | 5/2016 | Viazis |
| 2016/0175068 A1 | 6/2016 | Cai et al. |
| 2016/0367339 A1 | 12/2016 | Khardekar et al. |
| 2017/0128161 A1 | 5/2017 | See et al. |
| 2017/0144360 A1 | 5/2017 | Moore, III et al. |
| 2019/0090982 A1 | 3/2019 | Kuo |
| 2022/0160469 A1* | 5/2022 | Cunliffe ................ G16H 20/40 |

FOREIGN PATENT DOCUMENTS

| | | |
|---|---|---|
| CN | 103932807 | 7/2014 |
| CN | 105853008 | 8/2016 |
| CN | 106510867 | 3/2017 |
| WO | WO 98/58596 | 12/1998 |
| WO | 2008149221 A1 | 12/2008 |
| WO | WO 2015/140614 | 9/2015 |
| WO | WO 2016/040032 | 3/2016 |
| WO | WO 2016/110779 | 7/2016 |
| WO | WO 2020/026086 | 2/2020 |

OTHER PUBLICATIONS

International Search Report for PCT International Application No. PCT/IB2018/057516, mailed on Apr. 12, 2019, 12 pages.
Liang, "Comparing effects of different interproximal enamel reduction methods on dental enamel," Practical Clinical Journal of Integrated Traditional Chinese and Western Medicine, vol. 16, No. 11, pp. 79-82, dated Nov. 30, 2016.

* cited by examiner

*Primary Examiner* — Jerry Lin

(57) ABSTRACT

A method for generating digital setups for an orthodontic treatment path. The method includes receiving a digital 3D model of teeth, performing interproximal reduction (IPR) on the model and, after performing the IPR, generating an initial treatment path with stages including an initial setup, a final setup, and a plurality of intermediate setups. The method also includes computing IPR accessibility for each tooth at each stage of the initial treatment path, applying IPR throughout the initial treatment path based upon the computed IPR accessibility, and dividing the initial treatment path into steps of feasible motion of the teeth resulting in a final treatment path with setups corresponding with the steps. The setups can be used to make orthodontic appliances, such as clear tray aligners, for each stage of the treatment path.

20 Claims, 4 Drawing Sheets

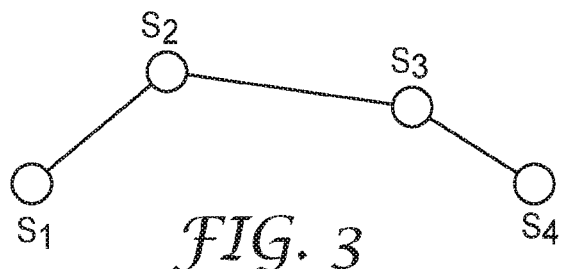
FIG. 3
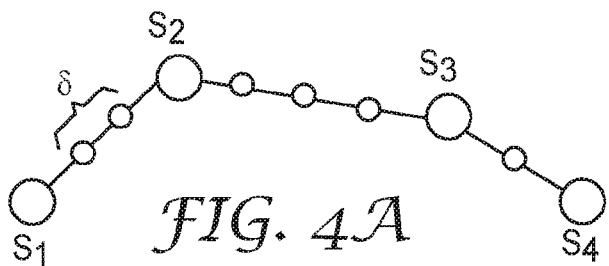
FIG. 4A
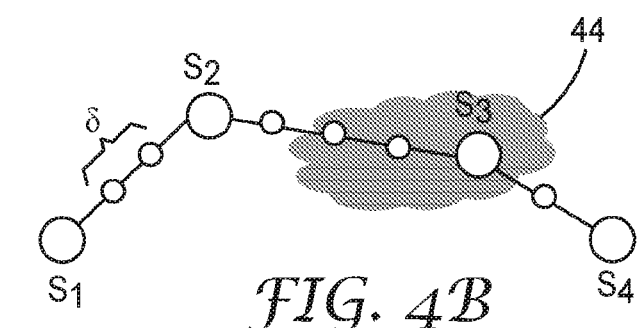
FIG. 4B
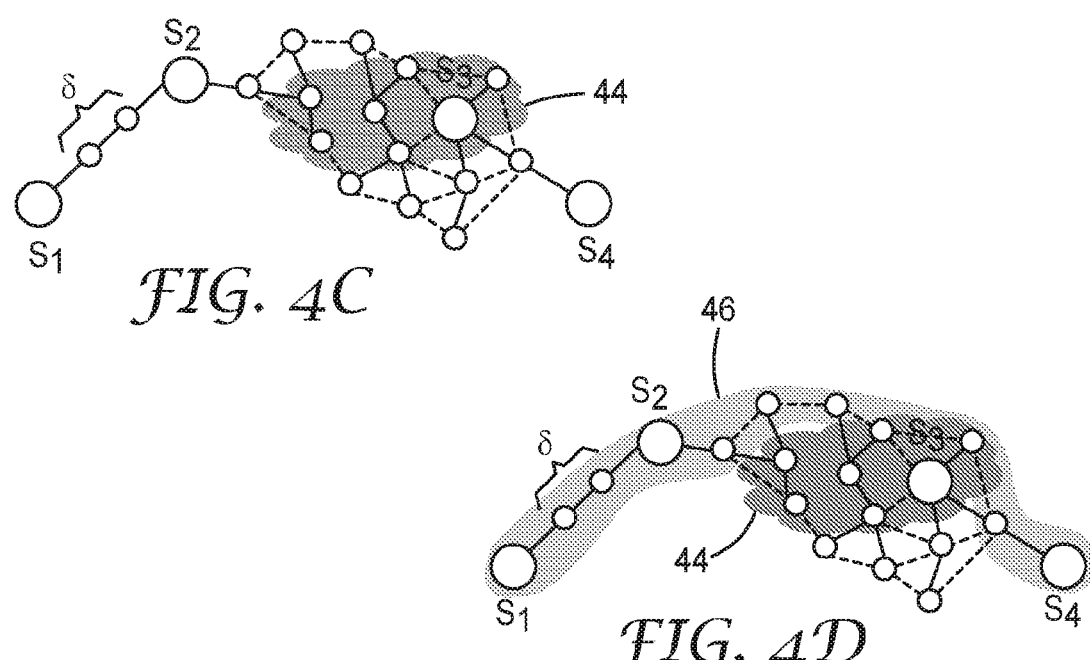
FIG. 4C
FIG. 4D

AUTOMATED PROCESS FOR INTERMEDIATE ORTHODONTIC DIGITAL SETUP GENERATION

CROSS REFERENCE TO RELATED APPLICATION

This application is a national stage filing under 35 U.S.C. 371 of PCT/IB2018/057516, filed Sep. 27, 2018, which claims the benefit of U.S. Provisional Application No. 62/569,081, filed Oct. 6, 2017, the disclosures of which are incorporated by reference in their entireties herein.

BACKGROUND

Intermediate staging of teeth from a malocclusion stage to a final stage requires determining accurate individual teeth motions in a way that teeth are not colliding with each other, the teeth move toward their final state, and the teeth follow an optimal (preferably short) trajectories. Since each tooth has 6 degrees-of-freedom and an average arch has about 14 teeth, finding the optimal teeth trajectory from initial to final stage has a large and complex search space. A need exists to simplify this optimization problem by dividing the trajectory to several shorter and easier to find trajectories, and by using other methods and techniques.

SUMMARY

A method for generating setups for an orthodontic treatment path, consistent with the present invention, includes receiving a digital 3D model of teeth, optionally performing IPR on the model and, after performing the optional IPR, generating an initial treatment path with stages including an initial setup, a final setup, and a plurality of intermediate setups. The method also includes computing IPR accessibility for each tooth at each stage of the initial treatment path, applying IPR throughout the initial treatment path based upon the computed IPR accessibility, and dividing the initial treatment path into steps of feasible motion of the teeth resulting in a final treatment path with setups corresponding with the steps.

Another method for generating setups for an orthodontic treatment path, consistent with the present invention, includes receiving a first digital model of teeth representing a first state, receiving a second digital model of teeth representing a second state, and dividing between the first and second states a set of states corresponding to feasible motion steps from the first state to the second state.

BRIEF DESCRIPTION OF THE DRAWINGS

The accompanying drawings are incorporated in and constitute a part of this specification and, together with the description, explain the advantages and principles of the invention. In the drawings.

FIG. 3 is a graph illustrating an initial sequence of digital setups;

FIGS. 4A-4D are graphs illustrating trajectory refinement for a sequence of digital setups;

DETAILED DESCRIPTION

Embodiments of this invention include a possibly partially to fully automated system to generate a set of intermediate orthodontic setups that allow a set of teeth to move from the maloccluded to the final setup state or allow for a partial treatment from one state to another state (e.g., an initial state to a particular intermediate state). Each arrangement of teeth ("state" or "setup") is represented as a node in a graph, and robotic motion planning is used to expand the graph and search for a path of valid states. These states or setups can be a digital representation of the arrangement of teeth at a particular stage of treatment, where the representation is a digital 3D model. The digital setups can be used, for example, to make orthodontic appliances such as clear tray aligners to move teeth along a treatment path. The clear tray aligners can be made by, for example, converting the digital setup into a corresponding physical model and thermoforming a sheet of material over the physical model or by 3D printing the aligner from the digital setup. Other orthodontic appliances, such as brackets and archwires, can also be configured based upon the digital setups.

The system and method can take into consideration interproximal reduction (IPR), which is the removal of some of the outer tooth surface, called enamel. IPR is also known as, and the term IPR includes, slenderizing, stripping, enamel reduction, reproximation, and selective reduction. IPR can be used, for example, between teeth that touch in order to make room to move teeth in orthodontic procedures. The system and method apply IPR to a digital 3D model of teeth to simulate application of IPR to actual teeth represented by the model. In other embodiments, the system and method do not require consideration of IPR. In other embodiments, the system and method can model the opposite of IPR using the same or similar techniques, for example as applied to bridges or implants.

In one embodiment, the method: 1) performs IPR up-front on a digital 3D model of teeth and generates an initial treatment path with digital setups; 2) computes IPR accessibility for each tooth at each stage of the initial treatment path and possibly determines when to apply IPR; and 3) applies IPR throughout the treatment path and divides the treatment path into steps of biologically feasible motion, a trajectory with points for the digital setups to make appliances corresponding with each setup. In other embodiments, the method can proceed without IPR or with IPR when possible to perform IPR.

Figure 1:
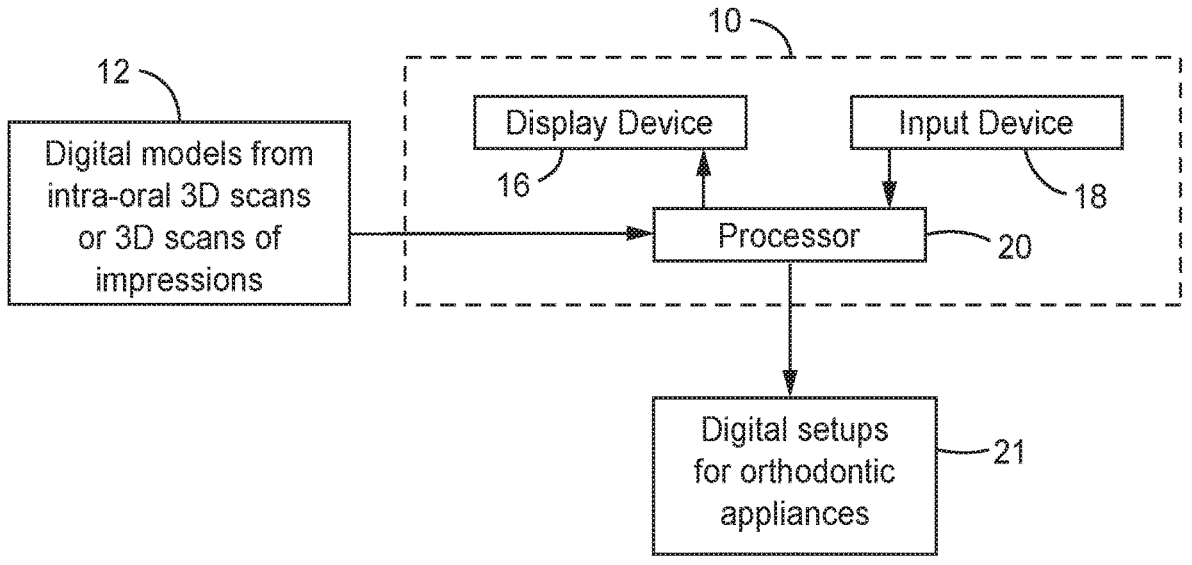
FIG. 1 is a diagram of a system for generating digital setups for orthodontic appliances.

FIG. 1 is a diagram of a system 10 for generating digital setups for orthodontic appliances (21). System 10 includes a processor 20 receiving digital 3D models of teeth (12) from intra-oral 3D scans or scans of impressions of teeth, or in other embodiments the system receives user manual input. System 10 can also include an electronic display device 16, such as a liquid crystal display (LCD) device, and an input device 18 for receiving user commands or other information. Systems to generate digital 3D images or models based upon image sets from multiple views are disclosed in U.S. Pat. Nos. 7,956,862 and 7,605,817, both of which are incorporated herein by reference as if fully set forth. These systems can use an intra-oral scanner to obtain digital images from multiple views of teeth or other intraoral structures, and those digital images are processed to generate a digital 3D model representing the scanned teeth and gingiva. System 10 can be implemented with, for example, a desktop, notebook, or tablet computer. System 10 can receive the 3D scans locally or remotely via a network.

The 3D scans addressed herein are represented as triangular meshes. The triangular mesh is a common representation of 3D surfaces and has two components. The first component, referred to as the vertices of the mesh, are simply the coordinates of the 3D points that have been reconstructed on the surface—i.e., a point cloud. The second component, the mesh faces, encodes the connections between points on the object and is an efficient way of interpolating between the discrete sample points on the continuous surface. Each face is a triangle defined by three vertices, resulting in a surface that can be represented as a set of small triangular planar patches.

A. Algorithm Overview

Embodiments include a motion planning-based approach to generate intermediate setups (staging) given an initial maloccluded setup and a final proposed setup. The goal is to produce a series of setups that bring the maloccluded setup into the final proposed setup that also meet some evaluation criteria while satisfying per-stage tooth movement limits. Evaluation criteria may require collision-free setups, minimal gingiva displacement, permitted motion, how motion can be related, or other conditions.

teeth, trajectories often should move and tip the teeth outward, apply IPR, and then retract/upright the teeth. In this case, one key setup could be added in addition to the first and last that specifies this flared-out configuration. Intermediate key setups may be generated manually by a technician or through an automated approach. One potential method for intermediate key setup generation is to encode a rule for coordinated tooth motion (e.g., flare out) that can be applied to a set of teeth. Another possible method uses a logic controller to create key intermediate setups based upon inputs, outputs, and rules as specified below.

The inputs variables of this logic controller are:

The difference between the current and the target position (i.e. position error vector) for each tooth ($c_x$, $e_y$, $e_z$), The Euler angles error vector for each tooth ($e_\varphi$, $e_\theta$, $e_\psi$), The penetration depth for tooth collision (Pd), and The direction of a possible penetration for tooth collision ($u_x$, $u_y$, $u_z$).

The output variables or the control commands of this logic controller are:

The Euler angles vector of the rotation command for each tooth ($d_x$, $d_y$, $d_z$), and The translation vector command for each tooth ($d_\varphi$, $d_\theta$, $d_\psi$).

In one embodiment, there are two sets of control rules that govern the key frame generation system: to control each tooth to converge to the tooth's final state or an intermediate state (Table 1), and to avoid collisions by moving in the opposite direction of the penetration depth (Table 2).

TABLE 1

A subset of rules that are applied to move a tooth along the
x-axis when the tooth is free to move (i.e. moving toward the
target position will not increase the penetration depth)

IF ( (Pd is ZERO) OR ($c_x$ is ZERO) OR ($c_x$ is NEGATIVE) ) AND ($e_x$ is POSITIVE)
    THEN $d_x$ is POSITIVE.
IF ( (Pd is ZERO) OR ($c_x$ is ZERO) OR ($c_x$ is POSITIVE) ) AND ($e_x$ is NEGATIVE)
    THEN $d_x$ is NEGATIVE.
IF ( (Pd is ZERO) OR ($c_x$ is ZERO) ) AND ($e_x$ is ZERO)
    THEN $d_x$ is ZERO.
...

TABLE 2

A subset of rules that are applied to move a tooth along the
x-axis when the tooth is not free to move (i.e. moving toward
the target position will increase the penetration depth).

IF (Pd is SMALL) AND ($c_x$ is POSITIVE) AND ($e_x$ is POSITIVE) THEN $d_x$ is ZERO.
IF (Pd is LARGE) AND ($c_x$ is POSITIVE) AND ($e_x$ is POSITIVE) THEN $d_x$ is NEGATIVE.
IF (Pd is SMALL) AND ($c_x$ is POSITIVE) AND ($e_x$ is ZERO) THEN $d_x$ is ZERO.
IF (Pd is LARGE) AND ($c_x$ is POSITIVE) AND ($e_x$ is ZERO) THEN $d_x$ is NEGATIVE.
IF (Pd is SMALL) AND ($c_x$ is NEGATIVE) AND ($e_x$ is ZERO) THEN $d_x$ is ZERO.
IF (Pd is LARGE) AND ($c_x$ is NEGATIVE) AND ($e_x$ is ZERO) THEN $d_x$ is POSITIVE.
IF (Pd is SMALL) AND ($c_x$ is NEGATIVE) AND ($e_x$ is NEGATIVE) THEN $d_x$ is ZERO.
IF (Pd is LARGE) AND ($c_x$ is NEGATIVE) AND ($e_x$ is NEGATIVE) THEN $d_x$ is
POSITIVE.
...

Figure 2:
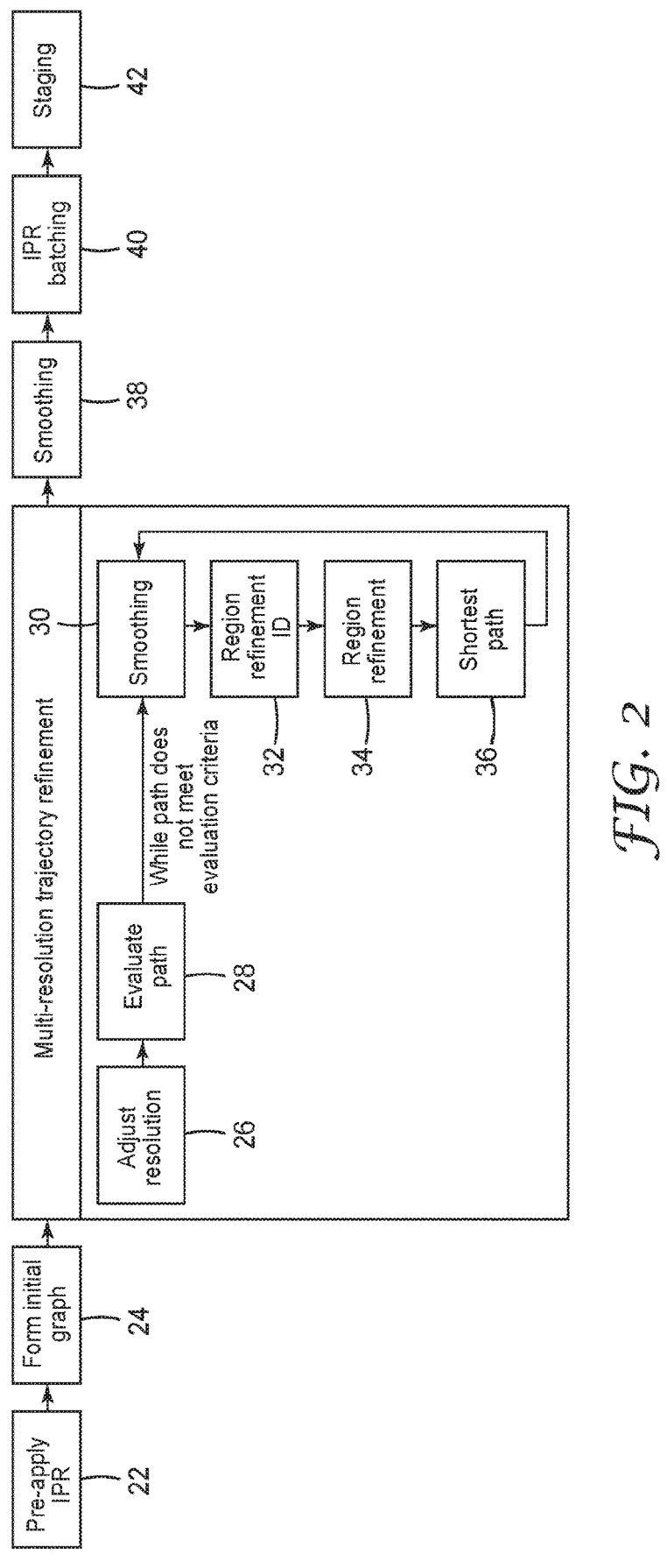
FIG. 2 is a flow chart of a method for generating digital setups for orthodontic appliances.

The flow chart shown in FIG. 2 provides an overview of the system and method. A sequence of key setups is provided as input, where the first is the maloccluded state, the last is the final proposed setup, and the others are additional setups ("key setups") that will help guide the motion. Key setups are a way to guide the search for intermediate setups, but key setups are not required for intermediates. For example with key setups, when creating space to reduce the crowding of All IPR is pre-applied to the maloccluded state (step 22). This means that the total IPR prescribed to be performed by the end of treatment is applied to the geometry that will be used throughout the region refinement step. After IPR is applied, a graph is formed including the key setups, $S_1$, $S_2$, $S_3$, and $S_4$ (step 24) as shown in FIG. 3, where $S_1$ is the initial maloccluded state, $S_4$ is the final setup at the end of treatment, and $S_2$ and $S_3$ are intermediate setups at different stages of treatment. Once a sequence of states has been created, multi-resolution trajectory refinement is performed (steps 26, 28, 30, 32, 34, and 36 explained below).

This trajectory refinement process is described for a single resolution in FIGS. 4A-4D. First, the shortest path through the graph is linearly interpolated at a resolution δ (FIG. 4A), where δ changes at each resolution in the multi-resolution approach. Once interpolated, each setup in the sequence is evaluated to see if the setup meets the given criteria (FIG. 4B). If the evaluation criteria are not met, the refinement process repeats until the shortest path meets the criteria. Invalid states are targeted for refinement (the setup in region 44 in FIG. 4C), and a search commences from these states and their neighbors. Here the search is at the same resolution δ for the linear interpolation. Additional edges are generated during the search (the dashed lines in FIGS. 4C and 4D) to allow for multiple paths in the graph between the initial and final setups. Edges are weighted by the node that they proceed from. After many new edges are added, a search is performed to find the new shortest path. If a path is found (region 46 in FIG. 4D), path smoothing can be performed. Path smoothing interpolates new edges between nearby states in the path and finds a new shortest path; edges are only added if the edges meet the given criteria at the resolution δ. In other embodiments, smoothing is not required. The refinement process repeats until all setups in the sequence meet the given criteria.

Once the sequence meets the evaluation criteria, the sequence is smoothed again (step 38), and a final path is returned (steps 40 and 42). The path is subsequently input into an IPR application step, which identifies where in the trajectory IPR application should occur. Staging then returns a series of setups at resolution l which may be larger than δ.

Algorithm 1 details this entire process. Specific sub-algorithm designs are discussed afterward.

B. Sub-Algorithm Design

Algorithm 1 is modular in that different implementations of the algorithm's sub-algorithms will give different behavior. Presented herein are specific implementations of each module that have proved successful for the given task.

B1. Pre-apply IPR (22)

In one embodiment using IPR, two methods are possible for pre-applying IPR. In the first method, the modifications described by the IPR planes and amounts are applied to the tooth geometry upfront, and this tooth geometry is used for the duration of the trajectory refinement. Alternatively, IPR-aware evaluation methods may be used during the trajectory refinement process. These evaluation methods can correctly evaluate states that describe not only tooth positions and rotations but mesial and distal IPR amounts (the "IPR configuration" portion of the state). In this case, the IPR configuration of the setup state is copied over the IPR configuration of the maloccluded state. The methods will produce identical behavior.

B2. Multi-Resolution Trajectory Refinement

The algorithm performs refinement of the path P at multiple resolutions, beginning at low resolution (large δ) and subsequently moving to higher resolutions (small δ). In the preferred mode, the algorithm uses the following array of δs: [8.0, 4.0, 2.0, 1.0]. Each step of multi-resolution adjustment is discussed individually below.

B2a. Resolution Adjustment (26)

This step modifies a path in a graph to enforce a given resolution. Algorithm 2 describes the implementation.

---

Algorithm 1

---

Input: The initial and final setups $v_0$ and $v_f$, and any key intermediate stages. Typically, $v_0$ is the maloccluded setup and $v_f$ is the final proposed setup.

Input: A list of step sizes, ResolutionList.

Input: A staging limit l.

Input: An evaluation function E that assigns scores to setups.

Output: A staged trajectory at resolution l that starts at $v_0$, ends at $v_f$ and minimizes undesirable motions.

1.  $v_0 \leftarrow$ PreapplyIPR($v_0$, $v_f$)

2.  Form a graph G containing vertices $v_0$ and $v_f$. $v_0$ and $v_f$ are connected in G. This may simply be a graph with only these 2 vertices and a single edge connecting them, a graph with a series of key setups informed by the case's motion rules, or a graph from a prior setup proposal search.

3.  P $\leftarrow$ ShortestPath(G, $v_0$, $v_f$)

4.  for δ in ResolutionList do

5.      P AdjustResolution(G, P, δ)

6.      while P does not meet E do

7.         R $\leftarrow$ IdentifyRefinementRegion(P, E)

8.         RefineRegion(G, $v_0$, $v_f$, R)

9.         P $\leftarrow$ ShortestPath(G, $v_0$, $v_f$)

10.         P, G $\leftarrow$ Smooth(P, E, δ)

11.      end while

12.      P, G $\leftarrow$ Smooth(P, E, δ)

13.      end for

14.      P $\leftarrow$ IPRBatching(G)

15.      return Stage(P, l)

---

---

Algorithm 2 AdjustResolution(G, P, δ)

---

Input: A graph G.
Input: A path P ∈ G.
Input: A stepsize δ.
Output: A new path P' that follows P at resolution δ. G is also updated to
resolution δ along P.
  1:  P' ← $p_1$.
  2:  for $p_i$ ∈ $p_2$ ... $p_n$ do
  3:        I ← Interpolate($p_{i-1}$, $p_i$, δ).
  4:        Append I to P'.
  5:        Remove the edge ($p_{i-1}$, $p_i$) from G. Add I to G with its corresponding edges.
  6:  end for
  7:  return P'.

---

This algorithm 2 uses an interpolate subroutine with two options: same finish where all teeth complete their motion at the same (last) stage; and fast finish where teeth complete their motion as fast as possible and may not all finish at the same stage. The preferred mode uses same finish.

B2b. Refinement Region Identification (32)

This identifies a subset of the trajectory P that needs further refinement according to some evaluation criteria E. Some options for the output of this algorithm could include returning all portions of P that violate E, or the first offender in P, or the worst offender in P. The following approaches are possible implementations for this refinement:

IdRefinementRegionFirst: Returns the first location along P where the score computed using the evaluation criteria exceeds a threshold score.

IdRefinementRegionWorstNeighbors: Returns the worst offender in P and its N neighbors in P. In the case of a tie (i.e., multiple worst offenders), the last worst offender in P is returned.

The preferred mode of the system uses IdRefinementRegionAll.

Refinement region identification uses an evaluation criterion that is defined by an evaluator subroutine. Other scoring criteria, such as tooth displacement from gingiva or number of vertices of overlap between teeth in the arch, can also be used in place of or in addition to these described metrics. The preferred mode uses collision contact points count.

B2c. Region Refinement (34)

This refines a region of an input graph G. Algorithm 3 provides this approach.

---

Algorithm 3 RefineRegion(G, $v_0$, $v_f$, R)

---

Input: A graph G
Input: The initial and final setups $v_0$ and $v_f$
Input: A region in G to refine R (identified using Refinement Region Identification)
Output: G is refined near R to produce a better path in G from $v_0$ to $v_f$
  1.        P ← ShortestPath(G, $v_0$, $v_f$)
  2.        $s_P$ ← ScorePath(P)
  3.        Let Candidates be the vertices in R.
  4.        Let Neighbors be the vertices adjacent to R.
  5.        while score(P) ≥ $s_P$ do
  6.              c ← SelectCandidate(Candidates)
  7.              c ' ← IterativePerturb(c)
  8.              if score(c') ≤ score(c)
  9.                    C ← Interpolate(c, c', δ)
  10.                   C_valid ← ExtractValidSubset(C)
  11.                   if len(C_valid) < max_length
  12.                         Add C_valid to G, Candidates, and Neighbors
  13.                         for each $c_{neigh}$ ∈ {k best scoring vertices in Neighbors} do
  14.                               C ← Interpolate(c ', $c_{neigh}$, δ)
  15.                               C_valid ← ExtractValidSubset(C)
  16.                               Add C_valid to G, Candidates, and Neighbors
  17.                         end for
  18.                   end if
  19.              end if
  20.              P ← ShortestPath(G, $v_0$, $v_f$)
  21.              P ← Smooth(P, E, δ)
  22.        end while

---

IdRefinementRegionAll: Returns all locations along P where the score computed using the evaluation criteria exceeds a threshold score.
IdRefinementRegionWorst: Returns the worst offender in P, defined as the element that received the worst score using the evaluation criteria. In the case of a tie (i.e., multiple worst offenders), the last worst offender in P is returned.
IdRefinementRegionWorstAll: Returns all worst offenders in P.

This algorithm 3 uses a SelectCandidate subroutine to identify a candidate from the list of Candidates. Two approaches have been identified for this subroutine:

1. Random selection: Chose the candidate randomly from the list of Candidates.

2. A* graph search: Select the candidate node based on the calculation of a heuristic. A heuristic is a quantity that estimates the "remaining cost" of a node (i.e., the quantified effort to travel from that node to the end state of the graph). The A* algorithm uses heuristics to efficiently search graphs, choosing the next node to explore using a heuristic to predict which node is most promising. A single node is selected for exploration from the list of Candidates using a heuristic. The following heuristics are possible:

Euclidean distance between the candidate state and the setup state: For each candidate state, compute the Euclidean distance between all tooth positions in the candidate state and the setup state; then compute the heuristic as the sum or average of these distances; and choose the candidate node by minimizing the heuristic.

Extent of collision: The extent of collision can be quantified by counting the number of points from one tooth that lie within the bounds of another tooth, or alternatively by computing the number of contact points between two meshes. Compute the heuristic as the count of these points of overlap between teeth in the arch. The next node can be chosen by maximizing the count of collisions (in order to force early exploration of problematic states) or minimizing the count of collisions (for an algorithmic approach that attempts to solve the problem by identifying locally optimal (i.e., easy-to-resolve) nodes before progressing to more difficult-to-resolve locations).

In the preferred mode, the candidate is chosen randomly for all iterations except for the first iteration, where instead the candidate with the worst score according to a heuristic is selected. The heuristic is the number of contact points.

Additionally, Algorithm 3 uses an IterativePerturb subroutine, which iteratively perturbs the state according to a Perturb function, ultimately choosing the state c' that achieves the best score according to an evaluator. In the preferred mode, IterativePerturb is called 50 times, and the evaluator computes the number of collision points. The preferred mode uses propagated directional perturbation, which perturbs teeth that are in collision as well as and neighboring teeth in the direction roughly opposite to the directional penetration vector.

Algorithm 3 uses a ScorePath subroutine to compute $s_P$, the score of the shortest path, P, along graph G. The path score can be computed using the function:

$$s_P = \text{sum}([(\text{number of collisions at location}_i + 1)^{1.25} \text{ for location}_i \text{ in } P])$$

An ExtractValidSubset subroutine is used to extract the subset of an interpolated path, C, that is valid according to some evaluator function. The preferred mode uses number of collision points as the evaluator, considering only nodes with 0 collision points to be valid.

The preferred mode for the Smooth function is the iterative smoother described in "B2d. Trajectory smoothing" below.

B2d. Trajectory Smoothing (30, 38)

There are many possible smoothing algorithms. One possibility (Algorithm 5) attempts all possible edges between any two nodes in P, only retaining those that meet E at resolution δ. However, this approach is computationally expensive, especially for long paths. Instead, smoothing can be attempted only for nodes that are within a distance threshold of each other. Another implementation includes an iterative smoother that applies this smoothing process repeatedly until a score is no longer improved through smoothing. This iterative smoother is the preferred mode.

---

Algorithm 5 Smooth(P, E, δ)

---

Input: A sequence of setups P from $p_0$ to $p_n$.
Input: An evaluation function E that assigns scores to setups.

-continued

---

Algorithm 5 Smooth(P, E, δ)

---

Input: A stepsize δ.
Output: A smoothed trajectory P' at resolution δ.
1:      Construct a graph G from the vertices and edges given by P.
2:      for all $p_i \in P$ do
3:          for all $p_j \neq p_i \in P$ do
4:             $P_{ij} \leftarrow$ Interpolate($p_i$, $p_j$, δ).
5:             if $P_{ij}$ meets E then
6:                Add $P_{ij}$ to G.
7:             end if
8:          end for
9:      end for
10:     return ShortestPath(G, $p_0$, $p_n$).

---

B3. IPR Batching (40)

Because IPR was pre-applied (Section B1), automated intermediate trajectory finding is performed initially with all IPR performed up front when teeth are in the maloccluded state. However, it is often impossible or not practical to do this in practice, as teeth need to be accessible in order to perform IPR and may not become accessible until a later point during treatment. This section provides a strategy for incorporating IPR batching into planning. The method takes as input the graph and path generated by the algorithm when IPR is applied up front (the output from Section 2). This path is then refined based on IPR application.

The method for IPR incorporation is described below. First, how to determine IPR accessibility is discussed. Then, different ways to apply IPR batching for a given trajectory are provided. In other embodiments, IPR batching is not required.

B3a. IPR Accessibility

Figure 5A:
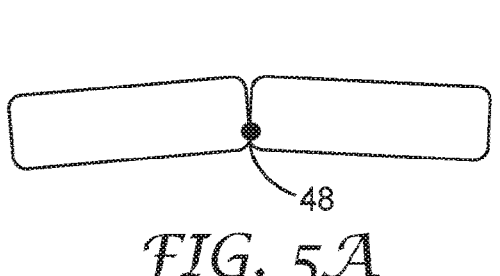
FIGS. 5A and 5B are diagrams illustrating accessible and inaccessible contacts for IPR application.
Figure 5A:
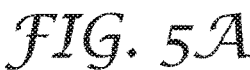
Figure 5B:
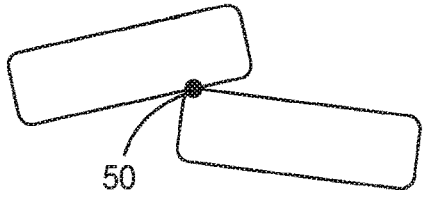
Figure 5B:

For realistic IPR application, the mesial or distal surface of the tooth must be accessible, meaning that the tooth cannot be situated behind another tooth or intersect with the labial/lingual surface of another tooth (see FIGS. 5A and 5B). IPR accessibility is thus determined by taking a weighted sum of tooth distance behind its neighboring tooth and tooth intersection with its neighboring tooth.

Figure 6A:
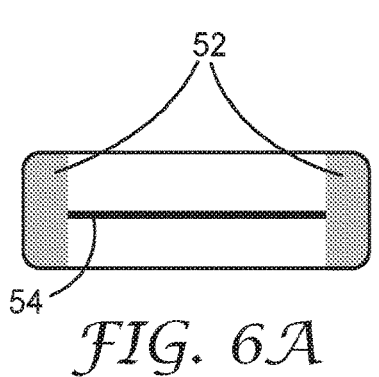
FIGS. 6A and 6B are diagrams illustrating IPR regions for accessible contact points.

To measure tooth distance in front of or behind another tooth, the mesial/distal region of each tooth is identified, as represented by the shaded regions 52 of FIGS. 6A (occlusal view) and 6B (frontal view). The distance between the mesial/distal points of neighboring teeth in the direction normal to the arch form is then computed. To measure tooth intersection with its neighbor, a ray is drawn along the tooth incisal edge, and the closest intersection point with the neighboring tooth is identified. The distance between the intersection point and the mesial or distal region of the neighboring tooth is computed. The following are several other approaches of determining if a contact between two neighboring teeth is approved for IPR application: by distance along the incisal edge from the mesial/distal surface, and by outward normal orientation, and a hybrid method that combines those two ways. These approaches are discussed in turn below.

Figure 6B:
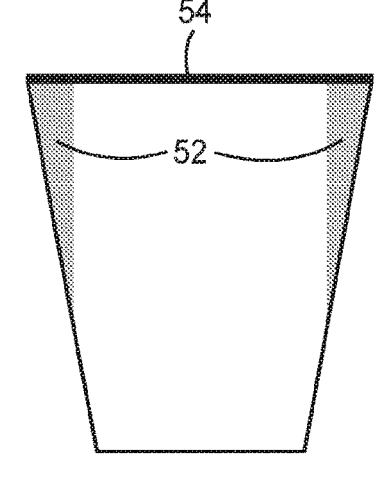

By Contact Point Projection to Incisal Edge. The algorithm defines the mesial/distal region as the area near the endpoints of the incisal edge, see the shaded regions 52 of FIGS. 6A (occlusal view) and 6B (frontal view). The incisal edge may be defined as: a line segment connecting incisal edge DSL/ABO landmarks (if landmarks are provided); and a line segment connecting the minimum and maximum tooth vertices along the tooth's local x-axis projected to the local z=0 plane (if no landmarks are provided). To determine accessibility, the contact point is first projected to the z=0 plane and then projected to the incisal edge line segment. If this projected point is within an absolute distance or distance percentage threshold to the nearest incisal edge endpoint, the point is accessible for IPR. Otherwise the point is not accessible. Likely an absolute distance would be sufficient as the maximum IPR to apply is given as input when the final setup is provided. A contact point is in the IPR region 52 if it lies nears the incisal endpoints 54, as shown in FIGS. 6A and 6B

Figure 7:
FIG. 7 is a diagram illustrating an IPR region for accessible contact points.

By Contact Point Outward Normal Orientation. The algorithm can also define the mesial/distal region as the area where outward normals are approximately oriented along the arch form (see the shaded region 56 of FIG. 7). IPR accessibility is determined by comparing the outward contact point normal to the local tooth x-axis.

Hybrid Approach. A hybrid approach combines the approaches presented above. If one approach is indeterminate, then the other approach can be used,

B3b. IPR Application

Once there is a model for determining if PR is accessible, that model can be used to decide when IPR is possible. This allows for relaxing the assumption that IPR is always immediately applied. RefineTrajectoryWithIPR is similar the trajectory refinement approach presented in Section B2 when only a single resolution level is used.

---

Algorithm 1 RefineTrajectoryWithIPR($v_0$, $v_f$, G, δ, l, E)

---

Input: The initial and final setups $v_0$ and $v_f$ Typically, $v_0$ is the maloccluded setup and $v_f$ is the final
    proposed setup. $v_0$ may not have IPR applied yet.
Input: A graph G containing vertices $v_0$ and $v_f$, $v_0$ and $v_f$ are connected in G and the shortest path
    between them is the result of a prior trajectory refinement where IPR was applied at the beginning.
Input: A stepsize δ.
Input: A staging limit l.
Input: An evaluation function E that assigns scores to setups.
Output: A staged trajectory at resolution l that starts at $v_0$, ends at $v_f$, IPR applied when accessible, and
    minimizes undesirable motions.
  1: for all v ≠ $v_f$ ∈ G do
  2:     Reset IPR degrees of freedom to 0 (e.g., none applied).
  3: end for
  4: P ← ShortestPath(G, $v_0$, $v_f$).
  5: P ← AdjustResolution(G, P, δ).
  6: ApplyIPR(P, G).
  7: while P does not meet E do
  8:     P ← Smooth(P, E, δ).
  9:     R ← IdentityRefinementRegion(P, E).
10:     RefineRegion(G, $v_0$, $v_f$, R).
11:     P ← ShortestPath(G, $v_0$, $v_f$).
12: end while
13: P ← Smooth(P, E, δ).
14: return Stage(P, l).

---

First, all applied IPR is reset back to 0, except for $v_f$. Then IPR is applied to P according to an IPR strategy (see Section B3c: IPR Strategy). Refinement proceeds as before to remove any remaining invalid portions of the trajectory.

The ApplyIPR subroutine examines the path P, applying IPR up to the limits given in $v_f$ only when accessible and based on an application policy, (IPRisAccessible in Algorithms 2 and 3 implements the desired access model from Section B3a, IPR Accessibility). When IPR is applied to a particular vertex, it is propagated to all of its children (i.e., IPR values only increase along the trajectory, meaning tooth material is not added back).

B3c. IPR Strategy

The following are two possible IPR batching policies: as soon as possible and batching to minimize the number of IPR sessions, As soon as possible. Algorithm 2 below simply iterates through P, applying the full IPR value from w to neighboring pairs of teeth that do not have the full value yet applied and are accessible as reported by IPRisAccessible (see Section B3a, IPR Accessibility).

---

Algorithm 2 ApplyIPR(P, G)

---

Input: A path P from $v_0$ to $v_f$ in G.
Output: An updated path P and graph G with IPR applied as soon as possible.
  1: v ← $v_0$.
  2: while v ≠ $v_f$ do
  3:     for each neighboring pair of teeth ($t_1$, $t_2$) ∈ r do
  4:         if IPR present between $t_1$ and $t_2$ at v < IPR present between $t_1$ and $t_2$ at $v_f$ then
  5:         If IPRisAccessible($t_1$,$t_2$) then -continued

| Algorithm 2 ApplyIPR(P, G) |
|---|

```
6:            Apply IPR to t₁ and t₂ with values from v_f
7:            Propagate IPR all children of v in P and G regardless of future accessibility and excluding
              e_f
              (as to not override final values with a partial application).
8:        end if
9:      end if
10:   end for
11:   v ← successor of v along P.
12: end while
13: return (P, G).
```

Batching to minimize number of IPR sessions. IPR batching can be considered as an optimization problem where one wants to minimize the number of times that IPR is applied. Thus, IPR should be fully applied when accessible. There is also a preference for applying IPR as early in treatment as possible.

Figure 8:
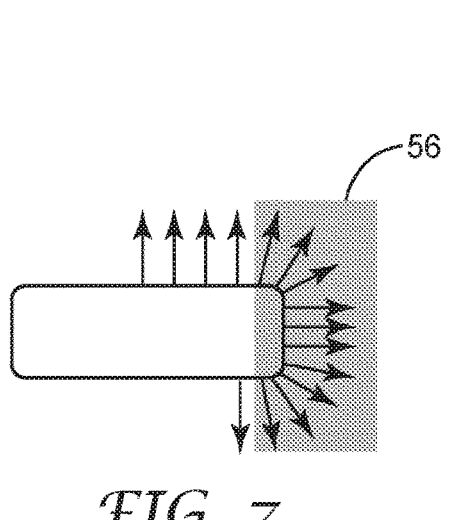
FIG. 8 is a graph of an accessibility matrix for IPR.
Figure 8:
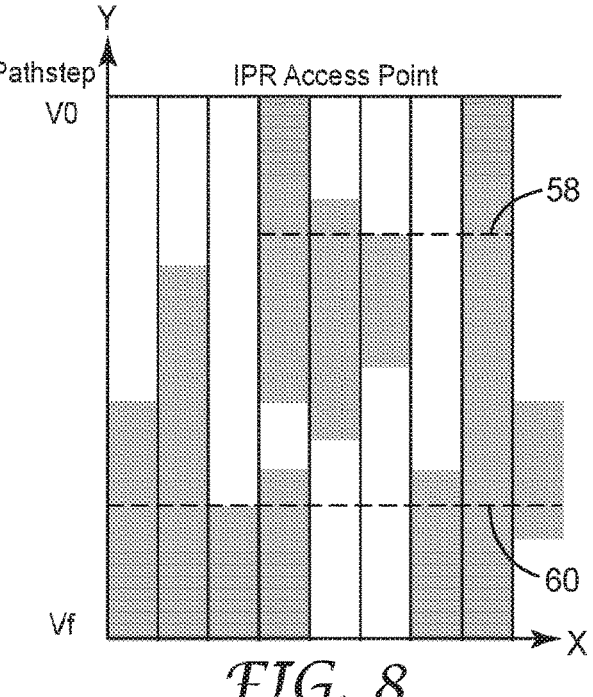

To optimize for hatching, the algorithm can examine when every IPR application point is accessible along P. The algorithm can use an accessibility matrix for this feature (FIG. 8) IPR application points lie along the x-axis in the matrix. Note that teeth that do not need any IPR applied (e.g., molars or teeth with the same IPR in $v_0$ as in $v_f$) are excluded from this matrix as they are not actionable IPR application points. The y-axis represents the path steps along P, going from $v_0$ to $v_f$. Each cell is shaded if that IPR application point is accessible at that path step (determined using IPRisAccessible from Section B6a). A horizontal cut, represented by lines 58 and 60, along this matrix represents applying IPR to the shaded set of teeth collectively. Thus, the algorithm seeks to minimize the number of cuts required to cover all IPR application points. For a given cut, IPR is applied at the first path step where the maximum number of teeth are accessible.

Algorithm 3 below outlines how this accessibility matrix may be used to apply batched IPR. In Algorithm 3, IPRisAccessible is not explicitly called before applying IPR, as it is implied in the construction of the accessibility matrix A.

| Algorithm 3 ApplyIPR(P, G) |
|---|

Input: A path P from $v_0$ to $v_f$ in G.
Output: An updated path P and graph G with IPR applied as soon as possible.
```
    1:  Construct o |P| × n accessibility matrix A, where n is the number of teeth pairs (i.e., IPR application
        points
    2:  Minimize the number of slices through A that cover all IPR application points. Let S contain these
        slices.
    3:  for each s ∈ S do
    4:      for each neighboring pair of teeth (t₁,t₂) ∈ s do
    5:          Apply IPR to t₁ and t₂ with values from v_f
    6:          Propagate IPR all children of r in P and G regardless of future accessibility and
                excluding v_f (as to not override final values with a partial application).
    7:      end for
    8:  end for
    9:  return (P, G)
```

The key step is the minimization function for finding the slices S. To do this, the algorithm adds slices to S starting with the slice that maximizes the number of remaining application points affected.

B4. Trajectory Staging (42)

The objective of trajectory staging is to create a path P at a resolution 1, which is defined based on per-stage tooth movement limits. Pseudo-code for this approach is shown below:

1. P_staged = P[0]

2. Compute Δd, the change in tooth position from maloccluded state for each node in

P

3. For each Δd:

a. If Δd > per-stage tooth movement limits:

b. Append P[i−1] (the node immediately prior to the current node) to P_staged c. Recompute Δd as the change in tooth position from P[i−1]

4. Append the setup state (P[end]) to P_staged

In the system, trajectory staging need not but could be used. Instead, the resolution that the system uses to interpolate the path is equal to the per-stage tooth movement limits.

C. Additional Components and Capabilities

C1. Multiple Path Extraction

This component enables a set of valid paths to be presented to a practitioner, enabling the practitioner or patient to select the desired treatment path. To benefit the technician or practitioner, multiple path choices should be dissimilar. In particular, they should all be viable but have different high-level properties such as number of IPR stages, amount of round-tripping, or other options. To provide this, paths should be scored or annotated based on such properties. Then the algorithm would identify all viable paths, sort them by score, and report back the best scoring paths that do not share the same properties as other, better-scoring, paths in the list.

C2. Multiple IPR Policies

This component would offer practitioners a choice of what IPR application policy to apply: as soon as possible, batching to minimize the number of treatments, or a policy in between. Options can be provided to the practitioner, who would then evaluate different options on a case by case basis if desired or if their preferred policy yields less than desirable results.

C3. Single vs. Multiple Arch

In one implementation, upper and lower arches are considered separately because it is an easier (and thus faster) problem to solve. In another embodiment, both arches are supported and considered together in the case that this is preferred, for example.

C4. Interactive Tools

Several of the library components can either be fully specified by the user, fully automated, or interactive, where the user provides inputs to the automatic method. This spectrum can be seen in the following areas.

Key Setup Generation—This can be one of the most difficult steps to automate yet the user may be able to provide inputs to the method. Selecting useful key setups could rely on the ability to classify what case type one is considering (crowding, midline correction, etc.). This is something that may be learned over time by an algorithm but is easy for a technician to provide (via quick visual inspection and an input such as a checkbox). In addition, a technician could also explicitly provide intermediate stages that characterize the corrective treatment plan for the case type.

Perturbation Motions—To a lesser degree than above, a technician may also be able to provide corrective motion planning possibly through approximate setup input. This planning can then be applied during automated perturbation of invalid states, enabling a clinically valid solution to be discovered more quickly.

Identification of Refinement Regions—If the algorithm is focused on some local minima, a user may be able to identify good regions for refinement based on visual inspection and manually perturb the state towards these good regions.

The invention claimed is:

1. A device for generating an orthodontic treatment plan for a patient, the device comprising:

one or more memories storing instructions; and one or more processors coupled to the one or more memories, the one or more processors individually or collectively configured to:

receive a digital three-dimensional (3D) model of a patient's teeth, wherein the 3D model is generated from intraoral scan data or scans of impressions;

modify the digital 3D model to simulate interproximal reduction (IPR) by altering digital representations of tooth surfaces at locations corresponding to planned enamel removal;

generate an initial treatment path comprising a sequence of digital setups, each setup representing a physically achievable arrangement of the patient's teeth at a given stage, including an initial setup, a plurality of intermediate setups, and a final setup;

for each tooth and each setup, evaluate accessibility for IPR by analyzing spatial relationships and proximity of tooth surfaces in the digital 3D model to determine, based on tooth position and contact points with adjacent teeth, whether a mesial region or a distal region of the tooth is accessible for enamel removal;

identify, based on the initial treatment path, a set of sequential steps of biologically feasible tooth movement within prescribed clinical limits;

subdivide the initial treatment path according to the set of sequential steps to produce a refined treatment path that includes identifying and selecting intermediate setups that are clinically feasible at each stage;

apply IPR throughout the refined treatment path at locations and stages determined to be clinically accessible to minimize a total number of IPR treatment sessions required for the patient; and output the refined treatment path as a sequence of digital setups for fabrication of orthodontic appliances configured to transition the patient's teeth from the initial setup to the final setup via the intermediate setups.

2. The device of claim 1, wherein the one or more processors are further configured to generate a final treatment path based at least in part on user input.

3. The device of claim 1, wherein the one or more processors are further configured to divide a final treatment path based at least in part on key frames.

4. The device of claim 1, wherein the one or more processors are further configured to generate multiple final treatment paths.

5. The device of claim 1, wherein the digital 3D model is generated from data acquired using an intraoral scanner.

6. The device of claim 1, wherein the one or more processors are further configured to export the refined treatment path in a format compatible with 3D printing or thermoforming.

7. The device of claim 1, wherein the one or more processors are further configured to align upper and lower arch models to maintain a desired bite relation during treatment.

8. The device of claim 1, wherein the one or more processors are further configured to dynamically update simulated IPR and tooth movement as changes in tooth geometry or accessibility occur during iterative refinement.

9. The device of claim 1, wherein the one or more processors are further configured to generate a visualization of accessible IPR regions using color-coded overlays on the digital tooth model.

10. The device of claim 1, wherein the one or more processors are further configured to optimize the sequence and magnitude of enamel removal to minimize the number of IPR sessions.

11. The device of claim 1, wherein the one or more processors are further configured to retrieve biologically feasible displacement limits from stored clinical parameters defining maximum rotation, translation, and tipping per treatment stage.

12. A non-transitory computer-readable medium storing instructions that, when executed by one or more processors, cause the one or more processors to perform a computer-implemented method for generating an orthodontic treatment plan for a patient, the method comprising:

receiving a digital three-dimensional (3D) model of a set of teeth corresponding to the patient, wherein the 3D model is generated from intraoral scan data or scans of impressions;

modifying the digital 3D model to simulate interproximal reduction (IPR) by altering digital representations of tooth surfaces at locations corresponding to planned enamel removal;

generating an initial treatment path comprising a sequence of digital setups, each setup representing a physically achievable arrangement of the patient's teeth at a given stage, including an initial setup, a plurality of intermediate setups, and a final setup;

for each tooth and each setup, evaluating accessibility for IPR by analyzing spatial relationships and proximity of tooth surfaces in the digital model to determine, based on tooth position and contact points with adjacent teeth, whether a mesial region or a distal region of the tooth is accessible for enamel removal;

identifying, based on the initial treatment path, a set of sequential steps of biologically feasible tooth movement within prescribed clinical limits;

subdividing the initial treatment path according to the set of sequential steps to produce a refined treatment path, including identifying and selecting intermediate setups that are clinically feasible at each stage;

applying IPR throughout the refined treatment path at locations and stages determined to be clinically accessible, minimizing a total number of IPR treatment sessions required for the patient; and outputting the refined treatment path as a sequence of digital setups for fabrication of orthodontic appliances.

13. The computer-readable medium of claim 12, wherein the instructions further cause the one or more processors to generate the refined treatment path based at least in part on user input.

14. The computer-readable medium of claim 12, wherein the instructions further cause the one or more processors to export the refined treatment path in a format compatible with 3D printing or thermoforming.

15. The computer-readable medium of claim 12, wherein the instructions further cause the one or more processors to align upper and lower arch models to maintain a desired bite relation during treatment.

16. The computer-readable medium of claim 12, wherein the instructions further cause the one or more processors to generate multiple alternative refined treatment paths for practitioner selection.

17. A method for generating an orthodontic treatment plan for a patient, the method comprising:

receiving, by a processor, intraoral scan data representing a patient's teeth and generating, from the scan data, a digital three-dimensional (3D) tooth model comprising mesh surfaces representing enamel boundaries of individual teeth;

for each tooth in the 3D tooth model, defining mesial and distal surface regions and generating surface-normal vectors extending from those regions toward an adjacent tooth;

evaluating, within the digital 3D tooth model, interproximal reduction (IPR) accessibility by simulating, along each surface-normal vector, a virtual dental tool having a predetermined width and determining whether a geometry of the virtual dental tool intersects a mesh surface of an adjacent tooth;

assigning, to each surface region, an IPR-accessibility metric based on a distance between the tooth surface and a neighboring mesh surface at which intersection occurs;

generating, by the one or more processors, an initial treatment path comprising a sequence of digital tooth arrangements including an initial setup, one or more intermediate setups, and a final setup, each arrangement being defined by a 3D transformation of individual tooth geometries;

subdividing the initial treatment path into incremental stages defining a refined treatment path in which each stage represents a physically achievable transformation of the 3D tooth geometries based on the IPR-accessibility metric and stored limits on biologically feasible tooth displacement;

modifying the digital 3D tooth model to simulate IPR by removing, from the mesh geometry, a volumetric portion of enamel at locations identified as physically accessible; and outputting the refined treatment path as a set of 3D digital models configured for fabrication of orthodontic appliances that reposition the patient's teeth from the initial setup to the final setup.

18. The method of claim 17, wherein the digital 3D tooth model is generated from intraoral scans or scanned impressions captured from multiple viewing angles.

19. The method of claim 17, wherein subdividing the initial treatment path includes identifying intermediate setups that maintain proper occlusal contact and avoid collisions between teeth.

20. The method of claim 17, wherein the set of 3D digital models are in a format compatible with 3D printing or thermoforming.

\* \* \* \* \*